(12) United States Patent
Pueschner et al.

(10) Patent No.: US 10,114,992 B2
(45) Date of Patent: Oct. 30, 2018

(54) ELECTRONIC IDENTIFICATION DOCUMENT

(71) Applicant: Infineon Technologies AG, Neubiberg (DE)

(72) Inventors: Frank Pueschner, Kelheim (DE); Jens Pohl, Bernhardswald (DE); Thomas Spoettl, Mintraching (DE); Peter Stampka, Burglengenfeld (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/644,863

(22) Filed: Jul. 10, 2017

(65) Prior Publication Data

US 2018/0025192 A1    Jan. 25, 2018

(30) Foreign Application Priority Data

Jul. 25, 2016   (DE) .................. 10 2016 113 656

(51) Int. Cl.
*G06K 5/00* (2006.01)
*G06K 7/10* (2006.01)

(52) U.S. Cl.
CPC .................. *G06K 7/10366* (2013.01)

(58) Field of Classification Search
CPC ................................. G06K 7/10366
USPC .................................. 235/380, 494
See application file for complete search history.

(56) References Cited

U.S. PATENT DOCUMENTS

| | | | | |
|---|---|---|---|---|
| 6,817,530 B2 * | 11/2004 | Labrec | ............... | G06K 19/08 235/487 |
| 8,181,884 B2 * | 5/2012 | Rodriguez | ............ | B42D 25/00 235/487 |
| 9,834,029 B2 * | 12/2017 | MacPherson | ......... | B42D 25/30 |
| 2010/0118378 A1 * | 5/2010 | Robertsson | ............. | G07D 7/00 359/267 |
| 2013/0278378 A1 | 10/2013 | Hoegerl et al. | | |
| 2015/0294602 A1 * | 10/2015 | Read | ................. | B41M 5/337 428/216 |

FOREIGN PATENT DOCUMENTS

| | | | |
|---|---|---|---|
| DE | 102009021722 A1 | 11/2010 | |
| DE | 102013103856 A1 | 10/2013 | |
| DE | 102012211150 A1 | 1/2014 | |
| WO | WO 2006042967 A1 * | 4/2006 | ............ D21H 21/48 |
| WO | 2010133418 A1 | 11/2010 | |
| WO | 2014001094 A1 | 1/2014 | |

* cited by examiner

*Primary Examiner* — Seung Lee
(74) *Attorney, Agent, or Firm* — Viering, Jentschura & Partner mbB (57) ABSTRACT

An electronic identification document is provided. The electronic identification document may include a carrier, an identification element, a microwave interaction structure configured to interact with microwave radiation, and an alteration element, wherein the alteration element may be part of or in contact with the microwave interaction structure and may be configured to alter, upon interaction of the interaction structure with microwaves, its state from an initial state to a permanent altered state, wherein the permanent altered state may differ from the initial state by a change of the alteration element in color, brightness, saturation, and/or transparency.

19 Claims, 8 Drawing Sheets

ELECTRONIC IDENTIFICATION DOCUMENT

CROSS-REFERENCE TO RELATED APPLICATION

This application claims priority to German Patent Application Serial No. 10 2016 113 656.5, which was filed Jul. 25, 2016, and is incorporated herein by reference in its entirety.

TECHNICAL FIELD

Various embodiments relate generally to an electronic identification document.

BACKGROUND

Documents used for an identification (ID documents) of a document owner, for example ID documents having only printed information, are typically falsified by manipulation of optical features, i.e. a photograph of the document owner, written content on the document or the hologram, etc.

ID documents including, for example in addition to printed information, also electronically stored information may be referred to as electronic identification documents, identification documents with electronic function, or eID documents.

Since the information stored in an electronic identification document, e.g. on a chip, e.g. a semiconductor chip, of an eID document can not be easily manipulated, a counterfeiter's strategy may typically be a destruction of the electronic device by submission to microwave radiation.

Currently, the microwave manipulation cannot be detected by optical inspection or other inspection methods, the ID card, for example the electronic function of the eID card, is simply considered as being defective.

Here, the counterfeiter may take advantage of an at least at present legal situation that the eID document is considered as valid, even if the electronic part of the document is defective. In other words, if the electronic part is defective, upon a check of the electronic identification document, for example by customs officials, the document may be accepted solely based on the optical information (which may for example be more easily counterfeited) present on the document.

Currently, there is no method available to detect the microwave attack on eID documents.

SUMMARY

An electronic identification document is provided. The electronic identification document may include a carrier, an identification element, a microwave interaction structure configured to interact with the microwave radiation, and an alteration element, wherein the alteration element may be part of or in contact with the microwave interaction structure and may be configured to alter, upon interaction of the interaction structure with microwaves, its state from an initial state to a permanent altered state, wherein the permanent altered state may differ from the initial state by a change of the alteration element in color, brightness, saturation, and/or transparency.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

The term "optically transparent" is used herein to mean that a material allows at least a portion of electromagnetic radiation of an optical wavelength (wherein the optical wavelength range may extend from about 380 nm to about 780 nm) directed into the material to pass through without being scattered.

Microwave radiation is used herein as referring to electromagnetic radiation with a frequency between about 300 MHz and 300 GHz. Most commonly used for a manipulation of electronic identification documents may be microwave radiation provided by a microwave oven, with a frequency of around 2.45 GHz.

Figure 1:
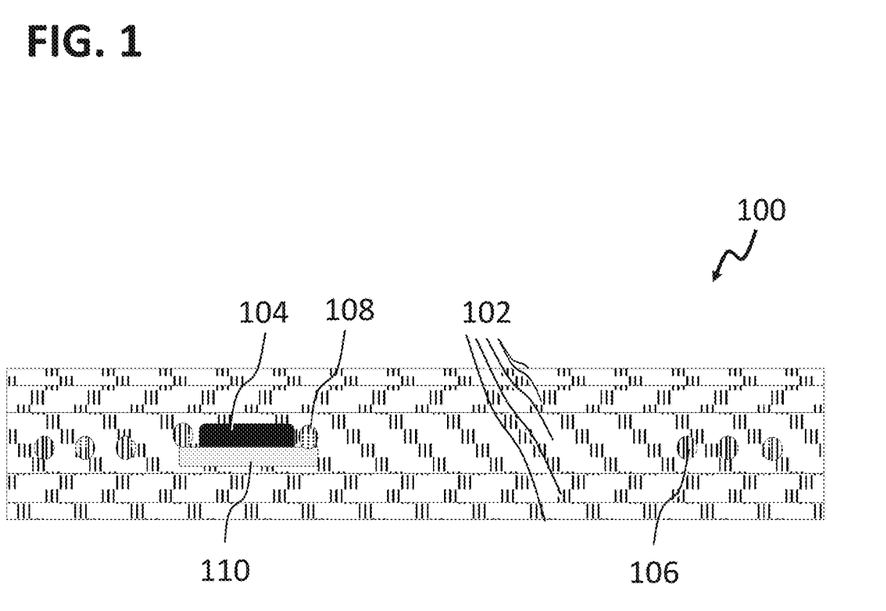
FIG. 1 shows a schematic cross section of an electronic identification document.

FIG. 1 shows a schematic cross section of a typical electronic identification document 100. The eID document 100 may include a carrier 102 and an electronic identification element 104, e.g. a chip. Identification information may be provided to an outside of the eID-document here by an antenna 108 electrically conductively connected to the identification element 104 and a booster antenna 106, which may be inductively coupled to the antenna 108 and may be used for communication to the outside of the eID-document.

The identification element 104 may be sensitive to certain radiation, for example to microwave radiation, for example to a radiation typically provided by a microwave oven.

This feature may be exploited by counterfeiters of electronic identification documents by deliberately damaging the electronic identification element 104, and counterfeiting only the identification information that is provided for optical inspection and that is more easily counterfeited.

In the known eID document, it is impossible to determine, at least from an outside of the eID document, whether the electronic identification element 104 broke spontaneously or due to a deliberate, e.g. microwave, attack.

In various embodiments, a method is provided for detecting a microwave manipulation of eID documents by providing an optically visible feature, also referred to as safety feature or alteration element, that may indicate a microwave attack on the eID document.

In various embodiments, thin (e.g. metallic) layers, which are included in the layers of the eID material stack, are provided.

In various embodiments, a safety feature according to various embodiments may consists of a very thin, structured layer, e.g. a thin structured metallic layer.

In various embodiments, the layer may be applied on one of a plurality of layers, e.g. layer sheets, of the eID card e.g. by sputtering, vapor deposition or similar methods.

In various embodiments, a thickness of the metallic structure may be very small, e.g. in a range from about 5 nm to about 100 nm, e.g. from about 10 nm to about 50 nm, so that the original layer (which may not have been manipulated by the microwave radiation) may be hardly visible by optical inspection.

In various embodiments, the alteration element, e.g. the metallic structure, may be situated between an outer (at least partially transparent, or for example essentially completely transparent) layer and a vertically adjacent layer. This positioning of the safety feature (the alteration element) may be used for an optical detection of a microwave attack.

In various embodiments, the alteration element, e.g. the metallic structure, may alternatively or additionally be situated between two of the inner card layers, which may typically be opaque. This positioning may for example be used for an electrical detection of the manipulation, for example by a measurement of a capacitance and/or an inductance of the alteration element.

In various embodiments, the alteration element, e.g. the metallic structure, may be positioned on an outer surface of the eID document, e.g. an eID card, and may be covered by an additional very thin protection layer to avoid tampering or mechanical removal by usage.

In various embodiments, the eID document, e.g. the eID card, may have a transparent window (transparent or at least partially transparent in a vertical direction of the eID card, for example in a region between the alteration element and a main surface of the eID document). In this case, the alteration element, e.g. the metallic structure, may in various embodiments be located in the area of the transparent window, e.g. in or under the transparent window.

In various embodiments, the alteration element, e.g. the metallic structure, may be arranged on a separate label, e.g a sheet or a layer, which may be included in a stack of layers of the eID document, e.g. in a card stack.

In various embodiments, the alteration element, e.g. the metallic layer, may include or consist of any metal that may be applied in thin layers by a sputter- or a physical vapor deposition (PVD) process.

In various embodiments, for a forming, e.g. a depositing, of defined colors, a stack of metals and metal oxides may be applied by above processes and may be structured afterwards. For such metal/metal oxide stacks, the irradiation by microwave radiation may cause a change in the color of the metallic structure.

In various embodiments, the structuring of the alteration element, e.g. the metal layer, may, for example, be performed by applying, e.g. depositing, of a complete metal layer, followed by a structuring by laser ablation, by sputtering or PVD through a mask, by applying a mask for sputter/PVD followed by a striping of the mask after the application process, and/or by other methods.

In various embodiments, the alteration element may permanently change at least one optical proberty, e.g. color, brightness, saturation, and/or transparency, upon the irradiation of the eID document with microwaves.

In various embodiments, the alteration element may permanently change at least one electrical property, e.g. capacitance, inductivity and/or electrical resistance, upon the irradiation of the eID document with microwaves.

In various embodiments, the alteration element may directly interact with the microwave radiation for the permanent change in at least one optical and/or at least one electrical property to occur.

In various embodiments, the alteration element may be part of a microwave interaction structure that may interact with the microwave radiation for the permanent change in at least one optical and/or at least one electrical property of the alteration element to occur.

In various embodiments, the alteration element may be in contact with the microwave interaction structure that may interact with the microwave radiation. The contact with the microwave interaction structure, for example by heat transferred from the microwave interaction structure to the alteration element, may cause the permanent change in at least one optical and/or at least one electrical property of the alteration element to occur.

In various embodiments, the alteration element and/or the microwave interaction structure may include or consist of metal.

In various embodiments, the alteration element and/or the microwave interaction structure may include or consist of a non-metallic material, for example a material with a dipole effect.

Figure 2A:
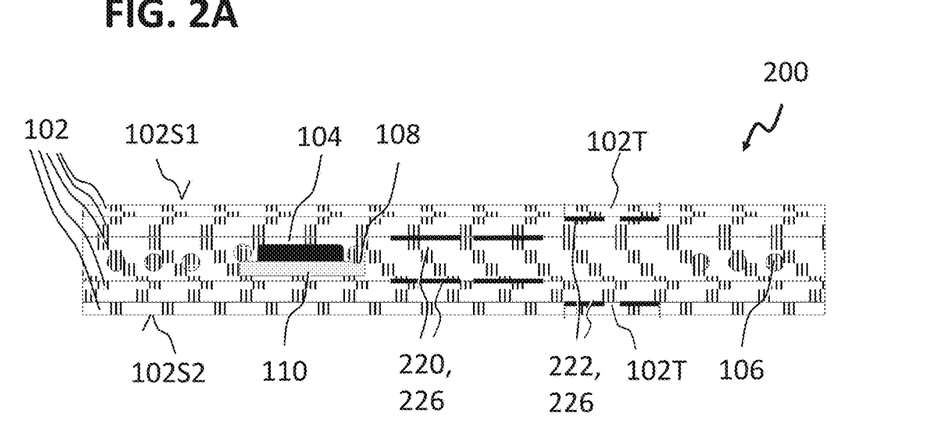
FIGS. 2A and 2B show schematic cross sections of electronic identification documents according to various embodiments.
Figure 2B:
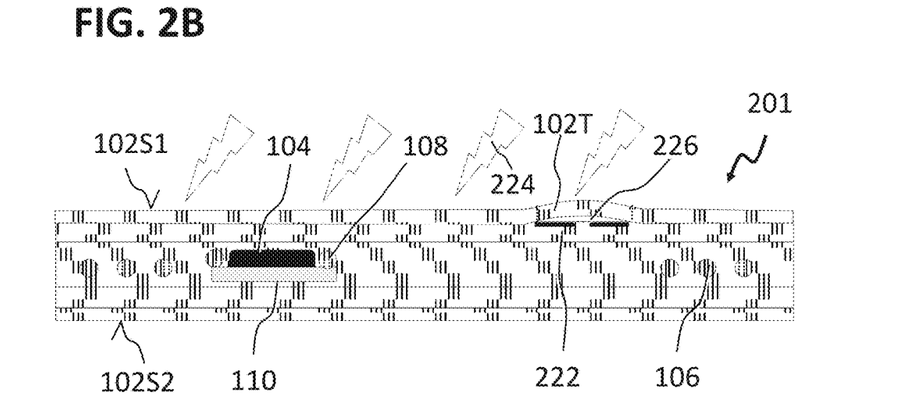

FIGS. 2A and 2B show schematic cross sections of electronic identification documents 200, 201 according to various embodiments.

The eID document may in various embodiments include an identification element 104 including identification information. The identification element 104 may be an electronic identification element, for example a chip, e.g. a semiconductor chip, a memory device, or the like. The identification element 104 may be similar or identical to identification elements of known eID documents, like e.g. the eID document 100 of FIG. 1.

In various embodiments, additional optical identification information 332 (see FIG. 3) may be provided for optical inspection, for example as printed information. The optical identification information 332 may for example include a photograph, name, address, signature, and the like. An information content of the optical identification information 332 may be the same as or different from an information content of the identification information stored in the electronic identification element 104.

In various embodiments, the eID documents 200, 201 may include a carrier 102 having a first main surface 102S1, also referred to as top surface 102S1, and a second main surface 102S2, also referred to as bottom surface 102S2.

The carrier 102 may include or consist of a plurality of layers. The carrier 102 may be similar or identical to known carriers 102 of eID documents, for example of the eID document 100 of FIG. 1, except for differences specified herein. For example, materials (including, for example, polycarbonate (PC)), functionalities (e.g., a support layer for the identification element 104 and/or a boost antenna 108, adhesion between various layers, protection from mechanical damage, for example provided by surface layers of the carrier 102, etc. The carrier may be formed by known processes, for example by laminating using temperature and pressure, and/or other known processes.

In various embodiments, the eID documents 200, 201 may include a microwave interaction structure 220 and/or 222, also referred to as interaction structure, configured to interact with microwave radiation.

In various embodiments, the eID documents 200, 201 may include an alteration element 226. The alteration element 226 may in various embodiments be part of or in contact, e.g. in physical contact, with the microwave interaction structure 220, 222.

In various embodiments, the alteration element 226 may be configured to alter, upon interaction of the interaction structure 220, 222 with microwave radiation, its state from an initial state to a permanent altered state.

In various embodiments, the permanent altered state may differ from the initial state by a change of the alteration element 226 in color, brightness, saturation, and/or transparency. In other words, the permanent altered state may differ from the initial state by a change of the alteration element 226 in at least one optical property.

Figure 3:
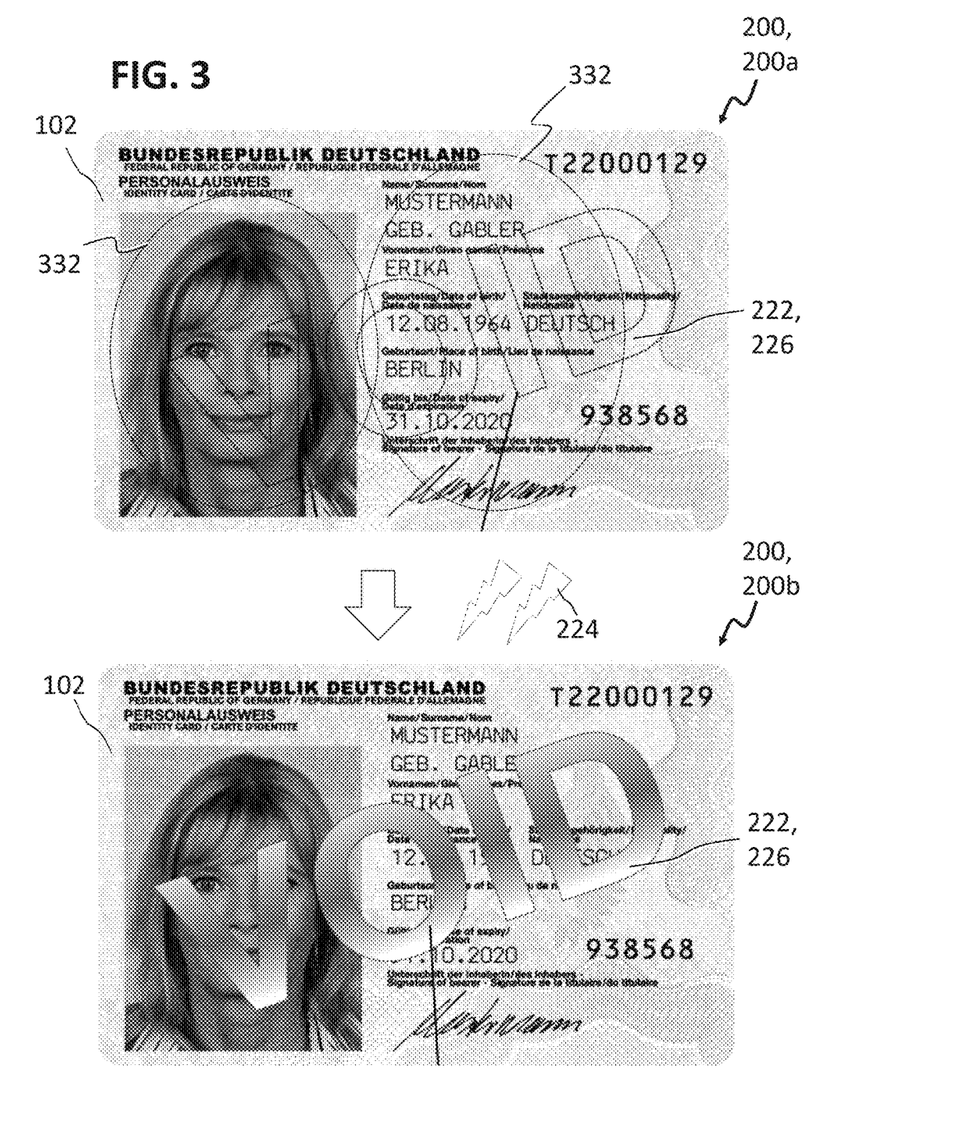
FIG. 3 shows a schematic view of an electronic identification document according to various embodiments before (top) and after (bottom) an irradiation with microwaves.

FIG. 3 shows, as a visualization of a change of the alteration element 226 in an optical property, a schematic view of an electronic identification document 200 according to various embodiments before (top, in state 200a) and after (bottom, in state 200b) an irradiation with microwaves 224. Here, a change in color and/or brightness may have occurred in the alteration element 226 due to the irradiation with the microwaves 224.

An outline of the alteration element 226, as shown in the top view, may in various embodiments be presented, such that an inspecting person may know where to expect a change arising from the change in the alteration element 226, or it may be omitted. In that case, the alteration element 226 may be visible, or be essentially or completely invisible before the irradiation with microwaves 224.

In various embodiments, the electronic identification document 200 may be optically at least partially transparent, for example with a transparency between 20% and 100%, e.g. between 50% and 100%, e.g. between 75% and 100%, for example essentially completely transparent, at least in a region 102T extending from the alteration element 226 to at least one main surface 102S1, 102S2 of the carrier 102. Thereby, the change of the optical property, e.g. color, brightness, saturation and/or transparency, may be visible, e.g. for an inspecting person, from an outside of the eID document 200. A transparency percentage, i.e. a percentage of light allowed to pass through the (at least partially transparent) material of the eID document 200, may be selected according to a thickness of the eID document 200 between the alteration element and the outside of the eID document 200, and according to an expected intensity of the change of the alteration element 226, such that the change in the alteration element 226 is expected to be visible through the (at least partially) transparent material from the outside of the eID document 200.

In various embodiments, depending on a structure and a position of the alteration element 226 in the eID document, e.g. an eID card, changes, also referred to as modifications, may be detected optically, either by bare eye or with optical instruments.

In various embodiments, the permanent altered state may differ from the initial state by a change of the alteration element 226 in inductivity, capacity and/or electrical resistance. In other words, the alteration element 226 may change an electrical property upon exposure of the eID document 200 by microwave radiation 224.

Figure 7:
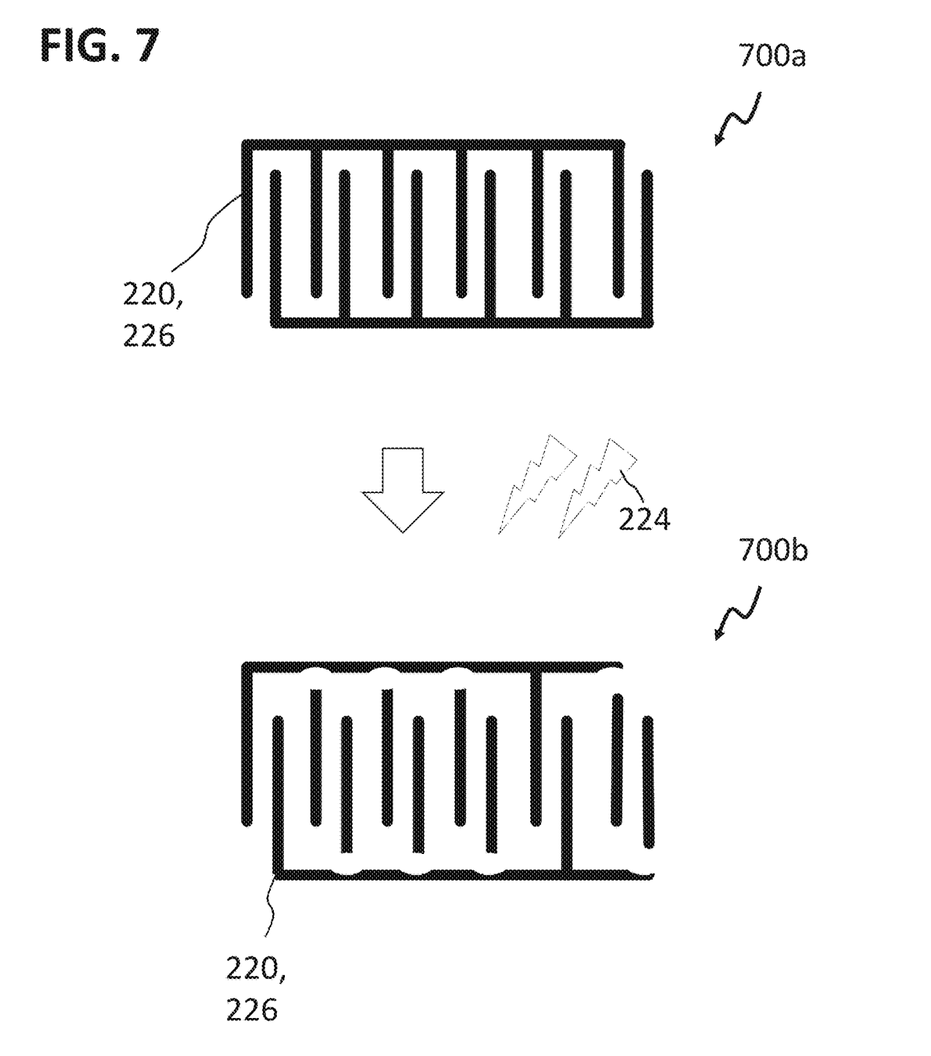
FIG. 7 shows a schematic top view of a microwave interaction structure having an alteration element according to various embodiments before and after an irradiation with microwaves.

In various embodiments, a detection of the changed electrical property may be possible by an electrical measurement. For example, antenna-like structures, e.g. as shown in FIG. 7, which may have a defined inductance, ohmic and capacitance characteristic, may be used. The microwave radiation 224 may cause a change in the, e.g. metallic, structure of the alteration element 226, for example structures may burn and cause open fuses and/or changed distances between capacitor plates, etc.

In various embodiments, this phenomenon may be utilized by forming the alteration element 226 as a structure with a defined electrical characteristic that may be destroyed during an irradiation by microwaves 224, such that the microwave attack may be proven.

In various embodiments, the alteration element 226 having the defined electrical property, e.g. inductance, ohmic and capacitance characteristic, may be designed such that an electrical contactless readout of one or more of the properties (also referred to as parameters) of the structure may be possible. For this, in various embodiments, standard IS=14443 readers with 13.56 Mhz operating frequency may be used.

In various embodiments, the alteration element 226 having the defined electrical property may be located in an opaque region of the carrier 102. The electrical contactless readout may not require the alteration element 226 to be visible. However, in various embodiments, it may be. For example, the alteration element 226 may have a defined initial optical state and a defined initial electrical state, and may undergo a change to a permanent altered state that differs from the initial state in both, an electrical and an optical property.

In various embodiments, the alteration element 226 may be part of the microwave interaction structure 220 and/or 222, wherein the microwave interaction structure 220 and/or 222 may be configured to interact with the microwave radiation 224. In various embodiments, thin metal layers with defined structures, which may be susceptible to the microwave radiation 224, may be utilized as the microwave interaction structure and/or as the alteration element 226.

In various embodiments, for example in a case of the microwave interaction structure 220 and/or 222 including metal, an electronic discharge may be caused in and/or on the metallic microwave interaction structure 220 and/or 222 when the electronic ID document 200 is exposed to the microwave radiation 224.

In various embodiments, the interaction between the microwave radiation 224 and the metallic microwave interaction structure 220 and/or 222 (for example, the electronic discharge) may cause at least a portion of the metallic microwave interaction structure 220 and/or 222 to change from the initial state to a permanent altered state that differs from the initial state in an electrical and/or an optical property. In other words, in that case, the portion of the metallic microwave interaction structure 220 and/or 222 may form the alteration element 226. See FIG. 5 and FIG. 7 for examples.

In various embodiments, the electronic discharge may be caused in and/or on the metallic microwave interaction structure 220 and/or 222 when the electronic ID document 200 is exposed to the microwave radiation 224, but the microwave interaction structure 220 and/or 222 may not or not significantly change its optical and/or electronic properties. However, the alteration element 226, which may be in contact with the microwave interaction structure 220 and/or 222, may undergo a change in its optical and/or electronic state due to the interaction of the microwave interaction structure 220 and/or 222 with the microwave radiation 224, wherein a result of the interaction, for example heat generated by the discharge and the like, may be severe enough to cause the change in the optical and/or electronic properties of the alteration element 226.

In various embodiments, for such an indirect interaction with the microwave radiation 224 to take place, the alteration element 226 may be in contact, e.g. in direct physical contact, with the microwave interaction structure 220 and/or 222.

In various embodiments, the alteration element 226 that may be in contact with the microwave interaction structure 220 and/or 222 may be a region of the carrier 102 material, for example the carrier 102 material surrounding the microwave interaction structure 220 and/or 222.

In various embodiments, a special material may be arranged in contact with the microwave interaction structure 220 and/or 222, for example a material that may undergo a desired color change, for example structures including or consisting of multiple metal and metal oxide layers, which may change color after microwave treatment, or a material that may show a large effect already with a low input of microwave energy.

In various embodiments, the discharge may cause a modification of the metallic microwave interaction structure 220 and/or 222 and the surrounding carrier 102 material (for example a plastic material, typically polycarbonate, PC may be used) and/or the dedicated alteration element 226 material. In that case, the alteration element 226 may include both, the regions of the microwave interaction structure 220 and/or 222 that may have undergone the change to the permanent altered state, and the carrier 102 and/or dedicated material.

In various embodiments, for example in a case of the alteration element 226 being expected to undergo a change of its electric properties, the microwave interaction structure 220 and/or 222 may be electrically insulated from the electronic identification element. Thereby, the alteration element 226, which may be part of or in contact with the microwave interaction structure 220 and/or 222, may assume a stable initial state before the microwave irradiation and a stable permanent altered state after the microwave irradiation.

In various embodiments, the alteration element 226 may include or may consist of metal, for example a pure or substantially pure metal, e.g. gold (Au), silver (Ag), aluminum (Al), or any other suitable metal, or for example a metal alloy.

In various embodiments, the microwave interaction structure 220 and/or 222 may include or may consist of metal, for example a pure or substantially pure metal, e.g. gold (Au), silver (Ag), aluminum (Al), or any other suitable metal, or for example a metal alloy.

In various embodiments, the eID documents 200, 201 may include a device 106, 108 for providing the identification information to an outside of the eID documents, for example a first antenna 108 electrically conductively coupled to the identification element 104 and a booster antenna 106 inductively coupled to the first antenna 108 and configured to wirelessly exchange information with an outside of the eID document. Alternatively or additionally, other devices 106 may be used for providing the identification information to the outside of the eID document, for example electrical contacts provided on an outer surface of the eID document and electrically coupled to the identification element 104, or the like.

Figure 4:
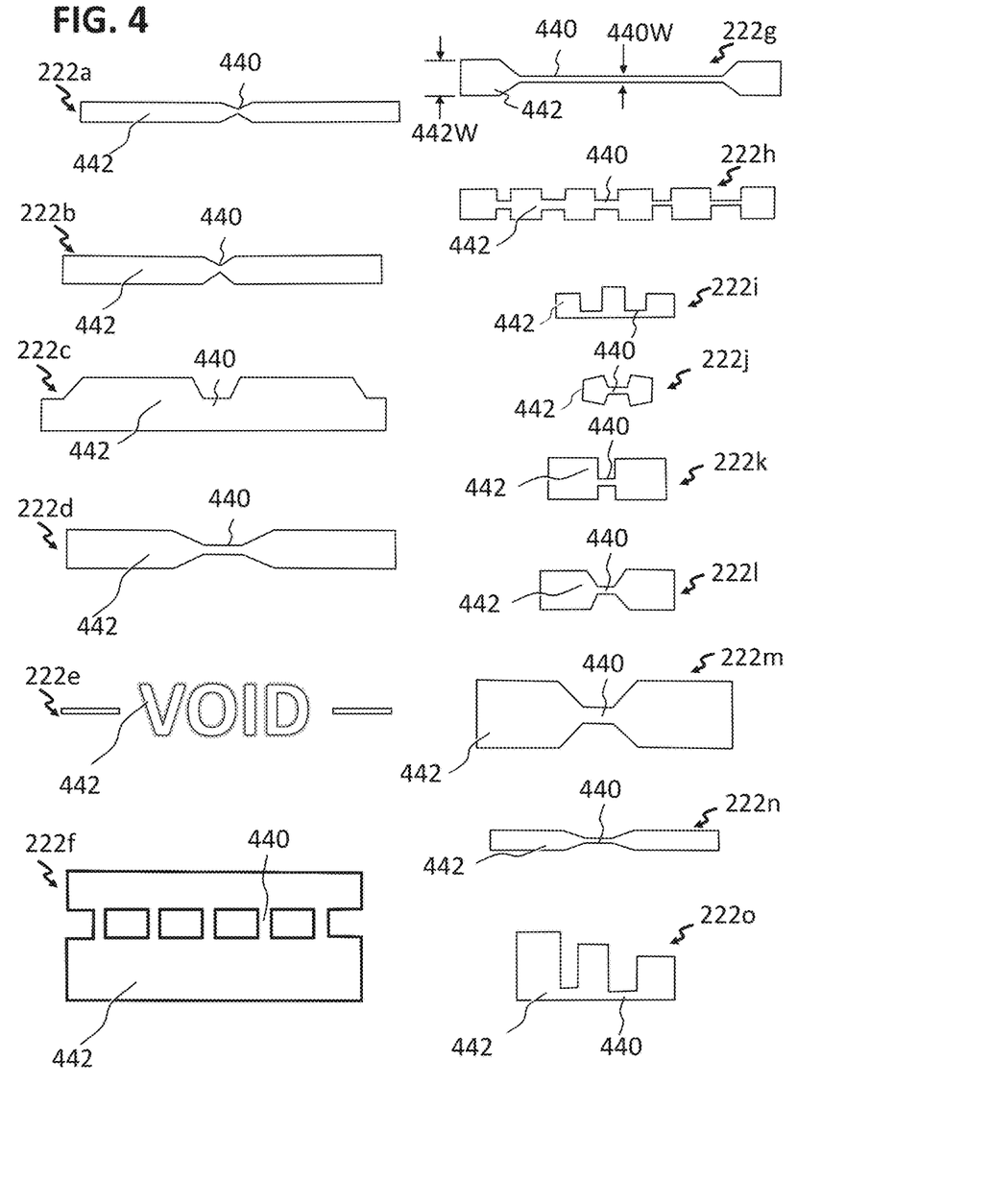
FIG. 4 shows schematic top views of microwave interaction structures according to various embodiments.

FIG. 4 shows schematic top views of microwave interaction structures 222a to 222o according to various embodiments.

Figure 5:
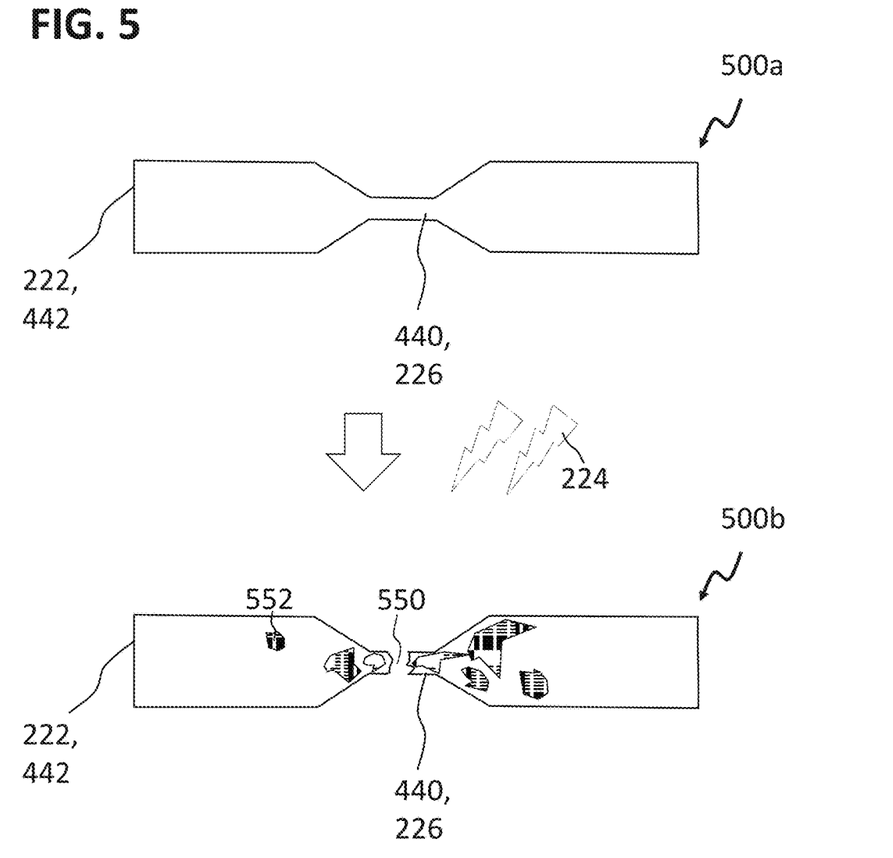
FIG. 5 shows schematic top views of a microwave interaction structure having an alteration element according to various embodiments before and after an irradiation with microwaves.

FIG. 5 shows schematic top views 500a, 500b of a microwave interaction structure 222 having an alteration element 226 according to various embodiments before (500a) and after (500b) an irradiation with microwaves 224.

Figure 6:
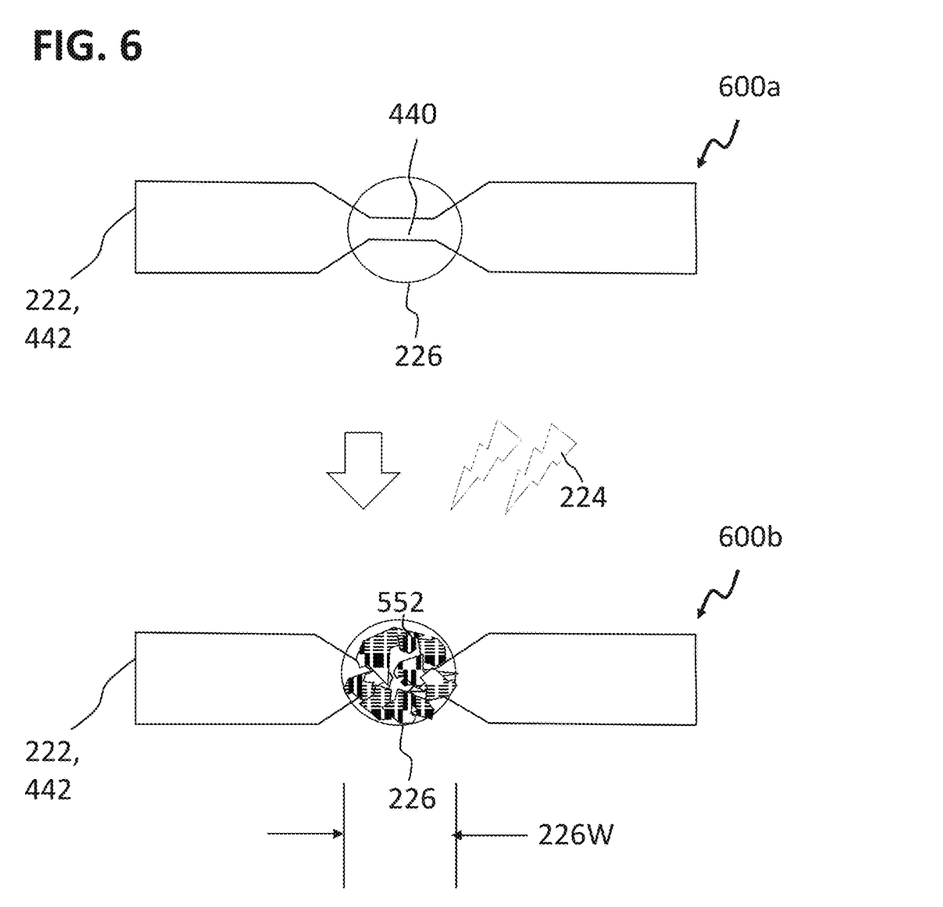
FIG. 6 shows a schematic top view of a microwave interaction structure in contact with an alteration element according to various embodiments before and after an irradiation with microwaves.

FIG. 6 shows schematic top views 600a, 600b of a microwave interaction structure 222 having an alteration element 226 according to various embodiments before (600a) and after (600b) an irradiation with microwaves 224.

FIG. 7 shows schematic top views 700a, 700b of a microwave interaction structure 220 having an alteration element 226 according to various embodiments before (700a) and after (700b) an irradiation with microwaves 224.

Even though reference numbers 222* have been chosen for the microwave interaction structures of FIG. 4, FIG. 5, and FIG. 6, which have been used to designate microwave interaction structures that may be expected to cause a change in the optical properties of the alteration element 226, and the reference number 220 has been chosen for the microwave interaction structure FIG. 7, which has been used to designate microwave interaction structures that may be expected to cause a change in the electrical properties of the alteration element 226, each of the alteration elements 226 that may be part of or in contact with the microwave interaction structures 220, 222 of FIG. 4 to FIG. 7 may also be expected to change one or more of the properties corresponding to the other designation.

In various embodiments, as shown in the exemplary microwave interaction structures 220, 222 of FIG. 4 to FIG. 7, the (e.g. metallic) microwave interaction structures 220, 222 of FIG. 4 to FIG. 7 may be formed such that the microwave radiation 224 can have the desired effect on the structure 220, 222.

In various embodiments, the microwave interaction structure 220, 222 may include a structured metal layer. The structured metal layer may be arranged essentially parallel to the main surfaces 102S1 and/or 102S2 of the carrier 102.

In various embodiments, the structured metal layer may have a thickness of less than 100 nm, for example between about 10 nm and about 60 nm, for example between about 20 nm and 50 nm.

In various embodiments, a geometry with a changing cross section (i.e. changing from wide lines to narrow lines, like metal fuses) may be advantageous to achieve the desired effect.

In various embodiments, as shown for example in FIG. 4 to FIG. 6, the microwave interaction structure 220, 222 may include a metal layer having at least one broad region 442 and at least one narrow region 440, wherein a width 442W of the at least one broad region 442 parallel to one or both of the main surfaces 102S1, 102S2 of the electronic identification document 200, 201, 202 may be larger than a width 440W of the at least one narrow region 440 (the widths 442W and 440W are only indicated for one exemplary embodiment, 222g in FIG. 4). In various embodiments, the microwave interaction structure 220, 222 may have the integrated alteration element 226.

In various embodiments, a ratio of the widths of the at least one broad region 442W and the at least one narrow region 440W is 2 or lager, e.g. 3 or larger, e.g. 4 or larger, e.g. 5 or larger, e.g. 10 or larger. In other words, 442W/440W≥2, e.g. 442W/440W≥3, e.g. 442W/440W≥4, e.g. 442W/440W≥5, e.g. 442W/440W≥10.

However, depending on a desired effect, a shape of the microwave interaction structure 220, 222 may not be limited to a specific shape, as long as the desired function of providing the interaction with the microwave radiation 224 that may cause the change from the initial state to the permanent altered state of the alteration element 226 is provided.

In various embodiments, the microwave interaction structure 220, 222 may have multiple broad regions 442 and/or multiple narrow regions 440, see e.g. 222f, 222h, 222i, 222o, etc.

In various embodiments, the sparks that may form upon irradiation of the electronic identification document 200, 201, 202 with microwave radiation 224 may form at least at and/or near the at least one narrow region 440. In various embodiments, an effect of the microwave radiation 224 on the microwave interaction structure 220, 224 may be strongest or only present at or near the narrow region 440.

In various embodiments, as for example shown in FIG. 5, the microwave interaction structure 220, 224 may be at least partially destroyed, e.g. in a destruction region 550 that may be located at or near the narrow region 440.

In various embodiments, the alteration element 226 may undergo a change of at least one of its optical properties. This is indicated in areas 552, which may be parts of the microwave interaction structure 220, 224. In various embodiments, the areas 552 may only be present or may be more concentrated near the narrow region 440.

In various embodiments the alteration element 226 may extend over most or all of the microwave interaction structure 220, 224.

In various embodiments, for example as shown in FIG. 6, the alteration element 226 that may be in contact with the microwave interaction structure 220, 224 may be in contact with the at least one narrow region 440. At or near the at least one narrow region 440, an effect caused in the microwave interaction structure 220, 224 may be strongest at or near the at least one narrow region 440.

In various embodiments, a size 226W of the at least one alteration element 226 parallel to the at least one main surface 102S1, 102S2 of the electronic identification document 200, 201, 202 may be at least 0.2 mm, e.g. at least 0.5 mm, e.g. 1 mm. In a case of the alteration element 226 being essentially circular, the electronic identification document 200, 201, 202 may have a size 226W that may correspond to a diameter of the circle. In various embodiments of the alteration element 226 having a polygonial, e.g. rectangular, quadratic, etc., the size 226W may refer to the largest size.

Figure 8:
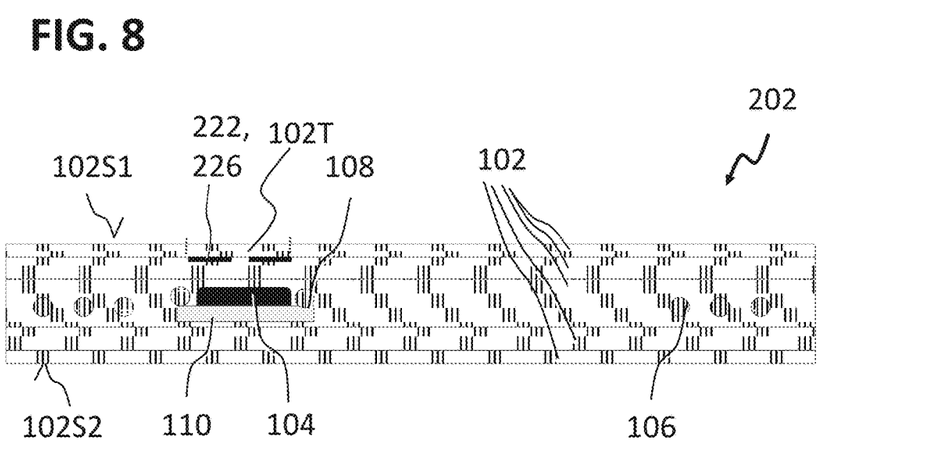
FIG. 8 shows a schematic cross sectional view of an electronic identification document according to various embodiments.

In various embodiments, as for example shown in FIG. 8, which shows a schematic cross sectional view of an electronic identification document 202 according to various embodiments, a position of the microwave interaction structure 220, 222 and the alteration element 226 in the eID document may be chosen such that the microwave interaction structure 220, 222 may be in close vicinity to the identification element, e.g. the semiconductor IC (PICC) in the eID document 200, 201, 202, e.g. the card. This may help to avoid a possibility of destroying the identification element 104, e.g. the PICC, by partially shielded or directed microwaves (wherein the shield may be configured to avoid a destruction of visible metallic features when destroying the PICC).

The microwave interaction structure 220, 222 and the alteration element 226 may, in various embodiments, be arranged between the identification element 104 and a main surface 102S1, 102S2 of the identification element.

In various embodiments, the microwave interaction structure 220, 222 may be arranged at a distance of less than 1 cm, e.g. less than 7 mm, e.g. less than 5 mm to the electronic identification element 104.

In an exemplary embodiment, for a proof of principle, thin metal test structures (~40 nm Au) have been applied on the surface of a polycarbonate (PC) card as microwave interaction structures 202, 222 with integrated alteration elements 226, and have been exposed to microwave radiation (using a standard kitchen microwave, 600W setting, exposure time ~10 s). During the microwave process, the electrostatic discharge could be observed after approximately 1-3 seconds, depending on the structure. The discharge continued randomly until the microwave was switched off (after ~10 s).

A similar effect on the thin metal structures and the surrounding card material may be expected when the thin metal structure 202, 222, 226 is laminated between two card layers 102. The vaporizing of the metal within a block of material may even cause very obvious optical effects.

In the exemplary embodiment, optical effects (a change of Au surfaces) could be seen on parts of the Au surface.

In addition, the test structures with changes in the cross section of the structure (also referred to as "fuse design") may show a change in resistance, i.e. all the fuses were OPEN after microwave radiation.

In various embodiment, a function of the microwave interaction structure 220 and/or 222 and of the alteration element 226 was described for the microwave interaction structure 220 and/or 222 and/or the alteration element 226 including metal. However, a similar functionality may be provided by a microwave interaction structure 220 and/or 222 and/or the alteration element 226 including or consisting of a different material, for example a material with a dipole effect.

In various embodiments, an electronic identification document is provided. The electronic identification document may include a carrier, an identification element, a microwave interaction structure configured to interact with microwave radiation, and an alteration element, wherein the alteration element may be part of or in contact with the microwave interaction structure and may be configured to alter, upon interaction of the interaction structure with microwaves, its state from an initial state to a permanent altered state, wherein the permanent altered state may differ from the initial state by a change of the alteration element in color, brightness, saturation, and/or transparency. In various embodiments, the electronic identification document may be optically at least partially transparent at least in a region extending from the alteration element to at least one main surface of the carrier.

In various embodiments, a size of the alteration element parallel to the at least one main surface of the electronic identification document may be at least 0.2 mm.

In various embodiments, the alteration element may include plastics.

In various embodiments, the electronic identification document may further include a chip.

In various embodiments, the alteration element may be embedded in the carrier.

In various embodiments, an electronic identification document is provided. The electronic identification document may include an electronic identification element and a microwave interaction structure configured to interact with microwave radiation and including an alteration element, wherein the alteration element is configured to alter, upon interaction of the interaction structure with microwaves, its state from an initial state to a permanent altered state, wherein the microwave interaction structure may be electrically insulated from the electronic identification element, and wherein the permanent altered state may differ from the initial state by a change of the alteration element in inductivity, capacity and/or electrical resistance.

In various embodiments, the electronic identification document may further include a carrier, wherein the microwave interaction structure may be embedded in the carrier.

In various embodiments, the microwave interaction structure may include a structured metal layer.

In various embodiments, the structured metal layer may have a thickness of less than 100 nm.

In various embodiments, the microwave interaction structure with the integrated alteration element may include a metal layer having at least one broad region and at least one narrow region, wherein a width of the at least one broad region parallel to a main surface of the electronic identification document may be larger than a width of the at least one narrow region.

In various embodiments, a ratio of the widths of the at least one broad region and the at least one narrow region is 5 or larger.

In various embodiments, the microwave interaction structure may be arranged at a distance of less than 5 mm to the identification element.

In various embodiments, the microwave interaction structure may be arranged between the identification element and a main surface of the carrier.

In various embodiments, the electronic identification document may be configured to enable a determining of the inductivity, capacity and/or electrical resistance of the alteration element from an outside of the electronic identification document.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

Various aspects of the disclosure are provided for devices, and various aspects of the disclosure are provided for methods. It will be understood that basic properties of the devices also hold for the methods and vice versa. Therefore, for sake of brevity, duplicate description of such properties may have been omitted.

What is claimed is:

1. An electronic identification document, comprising:
   a carrier;
   an identification element;
   a microwave interaction structure configured to interact with microwave radiation;
   a chip; and
   an alteration element, wherein the alteration element is part of or in contact with the microwave interaction structure and is configured to alter, upon interaction of the interaction structure with microwaves, its state from an initial state to a permanent altered state;
   wherein the permanent altered state differs from the initial state by a change of the alteration element in color, brightness, saturation, and/or transparency.

2. The electronic identification document according to claim 1,
   wherein the electronic identification document is optically at least partially transparent at least in a region extending from the alteration element to at least one main surface of the carrier.

3. The electronic identification document according to claim 2,
   wherein a size of the alteration element parallel to the at least one main surface of the electronic identification document is at least 0.2 mm.

4. The electronic identification document according to claim 1,
   wherein the alteration element comprises plastics.

5. The electronic identification document according to claim 1,
   wherein the alteration element is embedded in the carrier.

6. An electronic identification document, comprising:
   a chip;
   an electronic identification element; and
   a microwave interaction structure configured to interact with microwave radiation and comprising an alteration element, wherein the alteration element is configured to alter, upon interaction of the interaction structure with microwaves, its state from an initial state to a permanent altered state;
   wherein the microwave interaction structure is electrically insulated from the electronic identification element; and
   wherein the permanent altered state differs from the initial state by a change of the alteration element in inductivity, capacity and/or electrical resistance.

7. The electronic identification document according to claim 6, further comprising:
   a carrier;
   wherein the microwave interaction structure is embedded in the carrier.

8. The electronic identification document according to claim 7,
   wherein the microwave interaction structure is arranged between the electronic identification element and a main surface of the carrier.

9. The electronic identification document according to claim 6,
   wherein the microwave interaction structure comprises a structured metal layer.

10. The electronic identification document according to claim 9,
    wherein the structured metal layer has a thickness of less than 100 nm.

11. The electronic identification document according to claim 6,
    wherein the microwave interaction structure comprises a metal layer having at least one broad region and at least one narrow region, wherein a width of the at least one broad region parallel to a main surface of the electronic identification document is larger than a width of the at least one narrow region.

12. The electronic identification document according to claim 11,
wherein a ratio of the widths of the at least one broad region and the at least one narrow region is 5 or larger.

13. The electronic identification document according to claim 6,
wherein the microwave interaction structure is arranged at a distance of less than 5 mm to the electronic identification element.

14. The electronic identification document according to claim 6,
wherein the electronic identification document is configured to enable a determining of the inductivity, capacity and/or electrical resistance of the alteration element from an outside of the electronic identification document.

15. An electronic identification document, comprising:
a carrier;
an identification element;
a microwave interaction structure configured to interact with microwave radiation; and
an alteration element, wherein the alteration element is part of or in contact with the microwave interaction structure and is configured to alter, upon interaction of the interaction structure with microwaves, its state from an initial state to a permanent altered state;
wherein the permanent altered state differs from the initial state by a change of the alteration element in color, brightness, saturation, and/or transparency; and
wherein the electronic identification document is optically at least partially transparent at least in a region extending from the alteration element to at least one main surface of the carrier.

16. The electronic identification document according to claim 15,
wherein a size of the alteration element parallel to the at least one main surface of the electronic identification document is at least 0.2 mm.

17. The electronic identification document according to claim 15, wherein the alteration element comprises plastics.

18. The electronic identification document according to claim 15, wherein the alteration element is embedded in the carrier.

19. The electronic identification document according to claim 15, further comprising a chip.

* * * * *